United States Patent [19]

Fujimoto

[11] Patent Number: 5,745,256

[45] Date of Patent: Apr. 28, 1998

[54] IMAGE PROCESSING CONTROLLER

[75] Inventor: Masaya Fujimoto, Osaka, Japan

[73] Assignee: Mita Industrial Co., Ltd., Osaka, Japan

[21] Appl. No.: 377,117

[22] Filed: Jan. 23, 1995

[30] Foreign Application Priority Data

Jan. 27, 1994 [JP] Japan .................................. 6-007456

[51] Int. Cl.⁶ .................................................. H04N 1/00
[52] U.S. Cl. .......................... 358/434; 358/406; 358/468
[58] Field of Search ................................... 358/401, 406, 358/434, 468; 355/202, 203, 205

[56] References Cited

U.S. PATENT DOCUMENTS

| | | | |
|---|---|---|---|
| 5,177,621 | 1/1993 | Ohtaki et al. | 358/406 |
| 5,262,872 | 11/1993 | Yoshimura et al. | 358/406 |
| 5,270,774 | 12/1993 | Kikuchi | 358/406 |

*Primary Examiner*—Thomas D. Lee
*Attorney, Agent, or Firm*—Beveridge, DeGrandi, Weilacher & Young, LLP

[57] ABSTRACT

An image processing controller sets various data necessary for an image forming operation by performing a data communication with an operation unit of an electrographic copying machine. The image processing controller has a pseudo operation task having a function equivalent to the function of the operation unit with respect to data transfer and an image processing control task for performing a handshaking with the pseudo operation task. The pseudo operation task and the image processing control task are constituted by operation programs of a CPU provided in the image processing controller.

12 Claims, 3 Drawing Sheets

IMAGE PROCESSING CONTROLLER

BACKGROUND OF THE INVENTION

1. Field of the Invention

The present invention relates to an image forming apparatus such as a copying machine, and more particularly, to an image processing controller of the image forming apparatus.

2. Description of the Prior Art

As shown in FIG. 2, a digital color copying machine has an image processing controller 5 as well as in a copying machine 1, a scanner unit 2 which reads out an original image to convert it into an electric signal and outputs the signal, an operation unit 3 and a printer unit 4. The operation unit 3 includes a central processing unit (CPU) which generates commands to control processings based on operation of an operation key, the scanner unit 2 and the printer unit 4.

The image processing controller 5 also has a CPU which performs data communication with the operation unit 3 and sets data in accordance with circumstances. For example, the magnification of a zoom circuit and the coefficient of a filter are set by the controller 5. When a copy key is depressed at the operation unit 3, a handshaking as shown in Table 1 is performed between the operation unit 3 and the image processing controller 5. Prior to the depression of the copy key, various mode data and original/sheet data are transmitted from the operation unit 3 of the copying machine 1 to the image processing controller 5.

When the copy key is depressed, the operation unit 3 requests the image processing controller 5 to set a scanner mode. Receiving this request, the image processing controller 5 sets the scanner mode. When the setting is completed, the image processing controller 5 transmits a reply in the form of a recognition. Then, the operation unit 3 prepares for shading and transmits a shading request to the image processing controller 5. The image processing controller 5 performs shading and transmits a shading recognition. The shading is performed for both black image data and white image data.

Then, the operation unit 3 transmits a pre-scanning request. Receiving this, the image processing controller 5 sets a pre-scanning data and returns a pre-scanning recognition. The operation unit 3 performs a pre-scanning operation and transmits an image processing request. Receiving this request, the image processing controller 5 performs processings such as an original sensing, an original area processing, a color sensing and an automatic exposure. The original sensing is the sensing of the size of an original. The color sensing is the sensing of a specified color in color conversion. When these processings are completed, the results are returned in the form of an image processing recognition.

Receiving the results, the operation unit 3 performs various calculation processings. For example, when an original size data is transmitted, if the size of the original is A4 although the A3 size cassette is selected, a zoom magnification calculation is performed by using an automatic magnification selecting function. The calculation results are transmitted to the image processing controller 5. In the full-color copying where the development is performed in the order of magenta, cyan, yellow and black, the operation unit 3 transmits a command that the color developed at first be magenta to the image processing controller 5 and requests copying. When the calculation of the image processing data and the setting of the development of magenta are completed, the image processing controller 5 returns a recognition representing that copying is possible.

The operation unit 3 performs a copying operation of magenta. Then, the operation unit 3 transmits a command that the development color be cyan and requests copying. Thereafter, a handshaking and a copying operation similar to those of magenta are performed with respect to magenta, yellow and black to complete the color copying operation.

The image processing controller 5 sets the data through the handshaking with the operation unit 3. In other words, the conventional image processing controller 5 cannot set the data if the communication data are not transmitted from the operation unit 3. The image processing controller 5 is formed on one circuit board to be incorporated in the copying machine, and the function of the image processing controller 5 cannot be checked unless the controller 5 is connected to the copying machine to perform data transfer. This is frequently inconvenient when the manufacture of the image processing controller 5 is consigned to a subcontractor or a collaborator. For example, even if a copying machine is lent to a consignee, the maintenance of the copying machine is sometimes necessary. If the consignee is far away, a quick maintenance is difficult.

SUMMARY OF THE INVENTION

An object of the present invention is to provide an image processing controller capable of checking its own function by performing a pseudo copying operation.

To achieve the above-mentioned object, according to the resent invention, in an image processing controller which sets various data necessary for an image forming operation by performing a data communication with an operation unit of an image forming apparatus, pseudo operation means having a function equivalent to the function of the operation unit with respect to data transfer and means for performing a handshaking with the pseudo operation means.

With such a feature, the image processing controller is capable of obtaining pseudo copying information without being connected to the copying machine, so that the processing and setting of data can be performed based on the information. Thus, the function of the image processing controller is checked without the copying machine.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
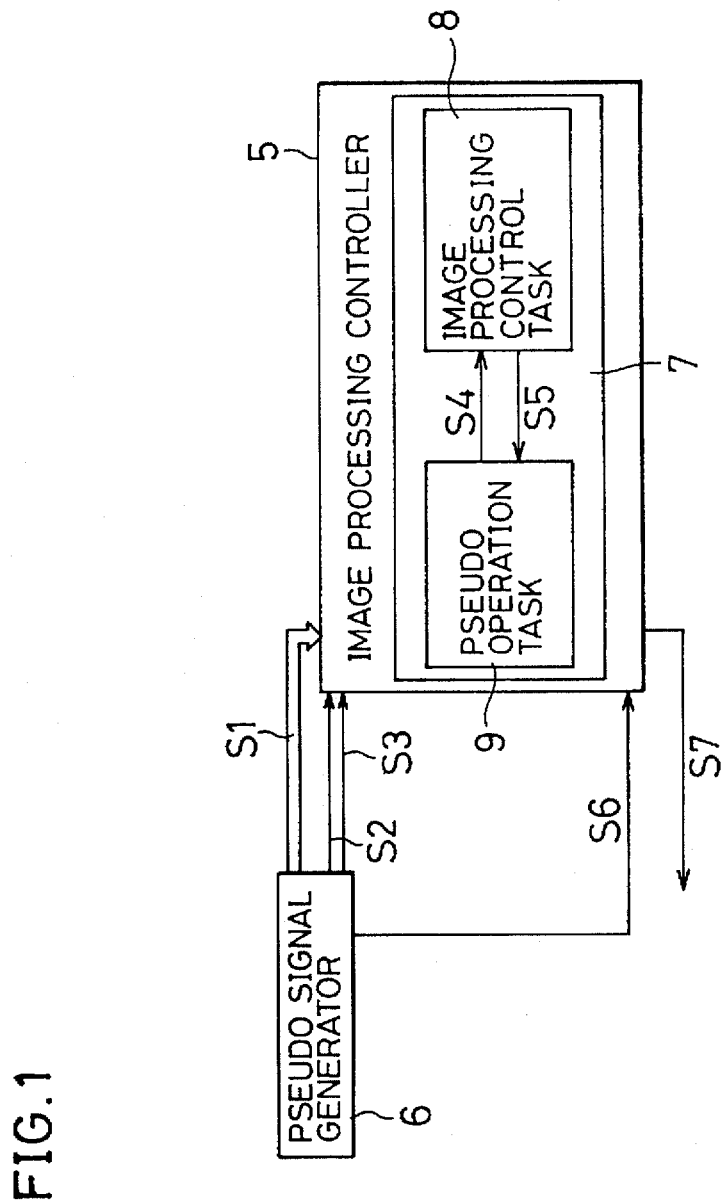
FIG. 1 is a block diagram of an image processing controller embodying the present invention.

Hereinafter, an embodiment shown in the drawings will be described. Referring to FIG. 1, there is shown the arrangement of a data communication arrangement for setting data in checking the function of an image processing controller 5. The image processing controller 5 is connected to a pseudo signal generator 6. The pseudo signal generator 6 is formed as a pattern generator which outputs an image data S1, a vertical synchronizing signal S2 which synchronizes with the front end of an original and a horizontal synchronizing signal S3 which supplies synchronism in the main scanning direction. Further, the pseudo signal generator 6 also outputs a second vertical synchronizing signal S6 which synchronizes with the front end of a copy sheet. The image processing controller 5 has a CPU 7, and has an image processing control task 8 and a pseudo operation unit task 9 as the programs for the CPU 7. In addition thereto, a task for simultaneously operating (transmitting) those tasks is provided. This task is not shown.

A data S4 is transmitted from the pseudo operation unit task 9 to the image processing control task 8, and a data S5 is transmitted from the image processing control task 8 to the pseudo operation unit task 9. A video data S7 is outputted from the image processing controller 5. The video data is a pulse width modulation (PWM) signal and serves as a drive signal for a laser apparatus to form a latent image on a photoreceptor drum.

When the image processing controller 5 operates to check its own function, the above-mentioned transmission of the signals S4 and S5 is permitted. At this time, the pseudo operation unit task 9 plays a part similar to that of the operation unit 3 of FIG. 2. Therefore, a handshaking as shown in Table 2 is performed between the pseudo operation unit task 9 and the image processing control task 8. This handshaking is substantially the same as the handshaking of Table 1 performed with the actual operation unit 3 of the copying machine. However, the setting of the scanner data does not exist. This is because it is unnecessary to set the scanner data since the scanner is not used in checking the function of the image processing controller 5.

Figure 3:
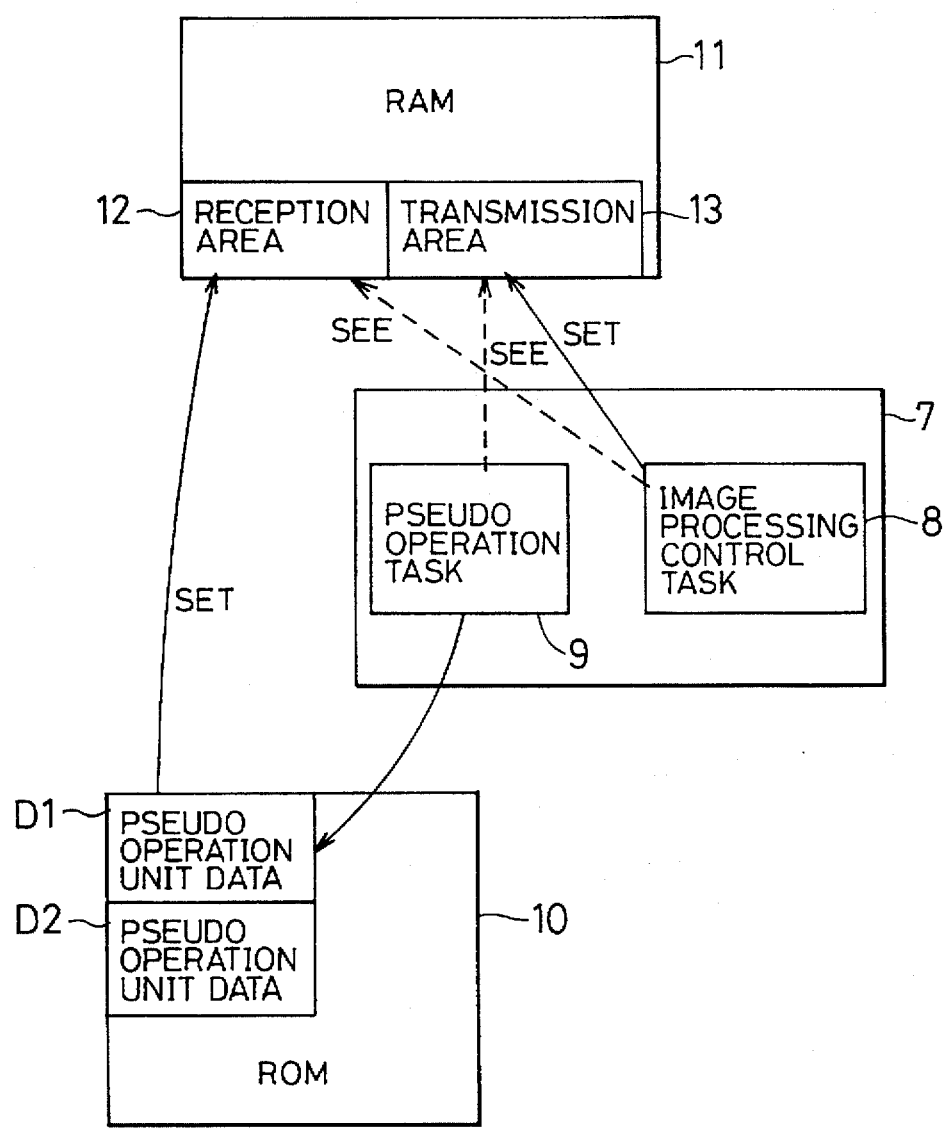
FIG. 3 is a view of assistance in explaining a pseudo communication operation in the image processing controller of FIG. 1.

Referring to FIG. 3, there is shown a conceptional arrangement centered on the image processing control task 8 and the pseudo operation unit task 9 in the image processing controller 5. Reference numeral 10 represents a read only memory (ROM) incorporating a data table in which pseudo operation unit data D1, D2, ... are stored. Reference numeral 11 represents a random access memory (RAM) including a reception area 12 for receiving the pseudo operation unit data and a transmission area 13 for receiving the results of the processings performed by the image processing controller 5.

First, the pseudo operation unit task 9 transfers (sets) the data D1 of the ROM 10 in the reception area 12 of the RAM 11. The image processing control task 8 sees this. Since the data D1 has been received, the task 8 performs a processing to the image processing controller 5. After the processing is completed, the task 8 sets the result of the processing in the transmission area 13 (i.e. returns the result as a recognition). The pseudo operation unit task 9 sees the contents of the result written in the transmission area 13. After confirming the result, the task 9 transmits the next step data D2 from the ROM 10 to the reception area 12. By successively performing this operation, a handshaking is seemingly performed between the pseudo operation unit task 9 and the image processing control task 8.

The image processing control task 8 and the pseudo operation unit task 9 are programs on the CPU. These programs must run simultaneously. Therefore, a base program to simultaneously run these programs is provided in the image processing controller 5.

Figure 2:
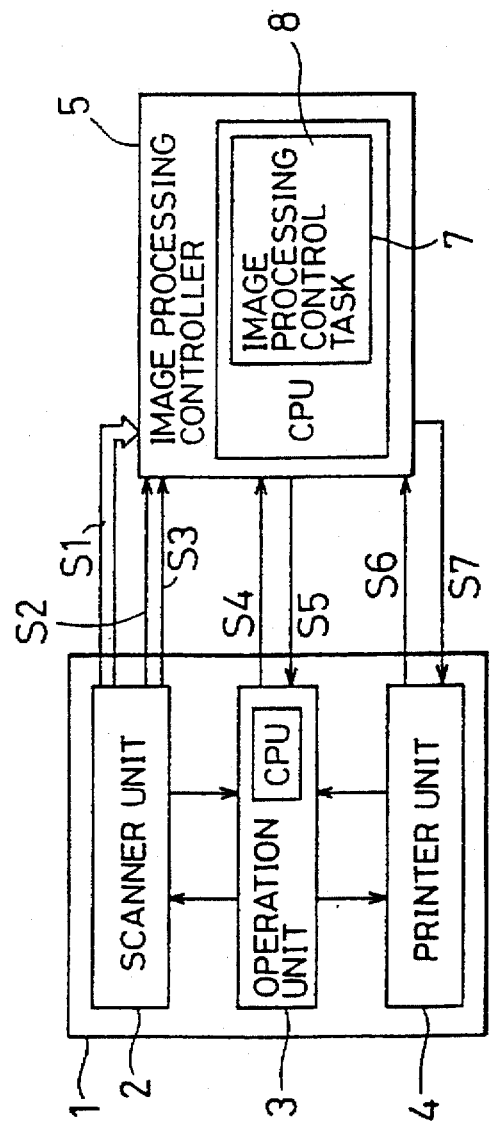
FIG. 2 shows the arrangement of a signal transfer between the image processing controller and the copying machine.

When the image processing controller 5 of this embodiment is incorporated in an electrographic copying machine to perform an actual copying operation, the image processing controller 5 is connected as shown in FIG. 2 to perform data communication with the actual operation unit 3. Therefore, the pseudo operation unit task 9 is not operated.

As described above, according to the present invention, the image processing controller is capable of checking its own function in the function check performed at the time of the manufacture of the image processing controller, so that only the pattern generator is necessarily connected to the image processing controller and that no actual image forming apparatus in which the image processing controller is to be incorporated is necessary. Thus, the present invention is convenient and the manufacture and test processes are smoothly performed.

Obviously, many modifications and variations of the present invention are possible in light of the above teachings. It is therefore to be understood that within the scope of the appended claims, the invention may be practiced other than as specifically described.

TABLE 1

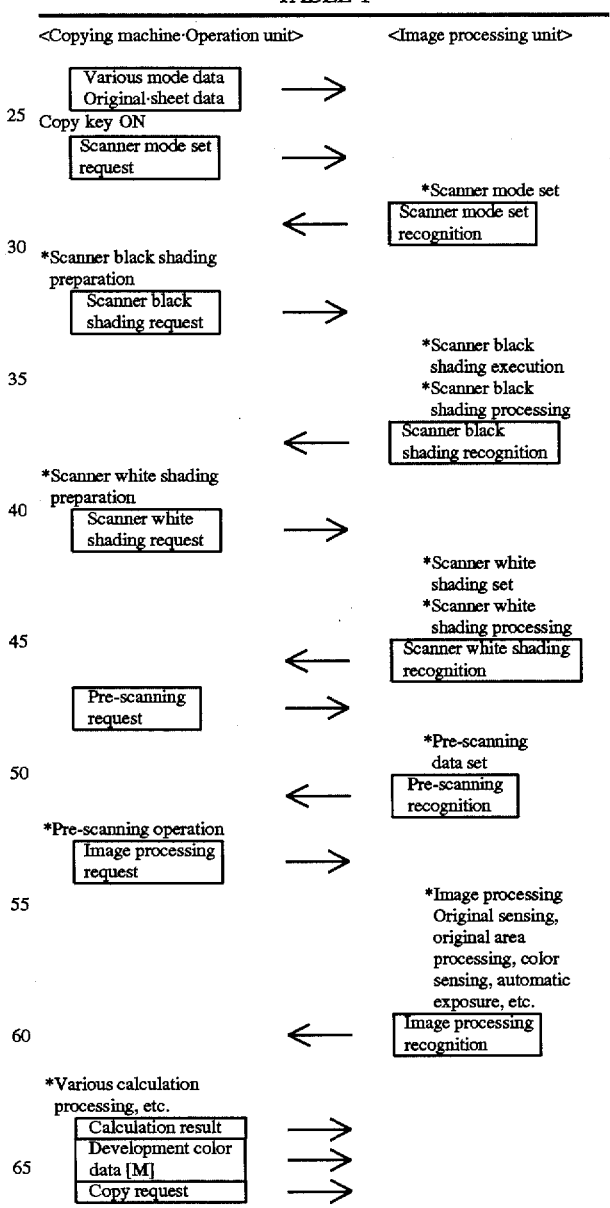

TABLE 1-continued

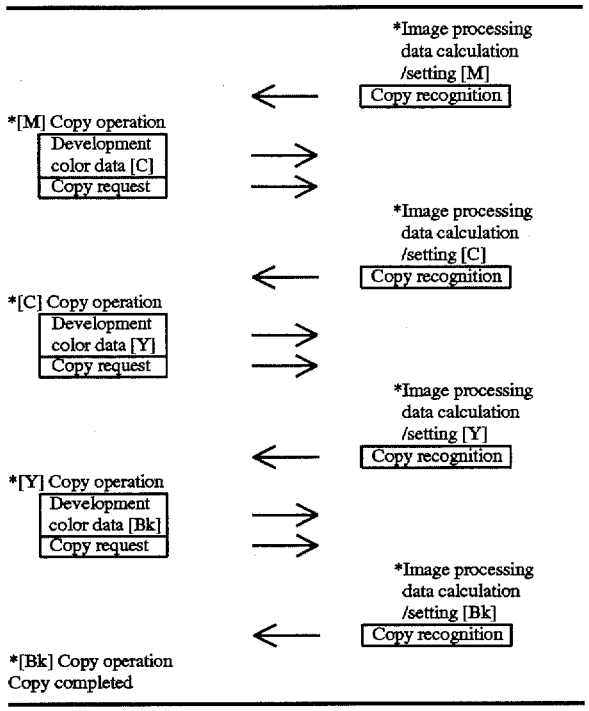

TABLE 2

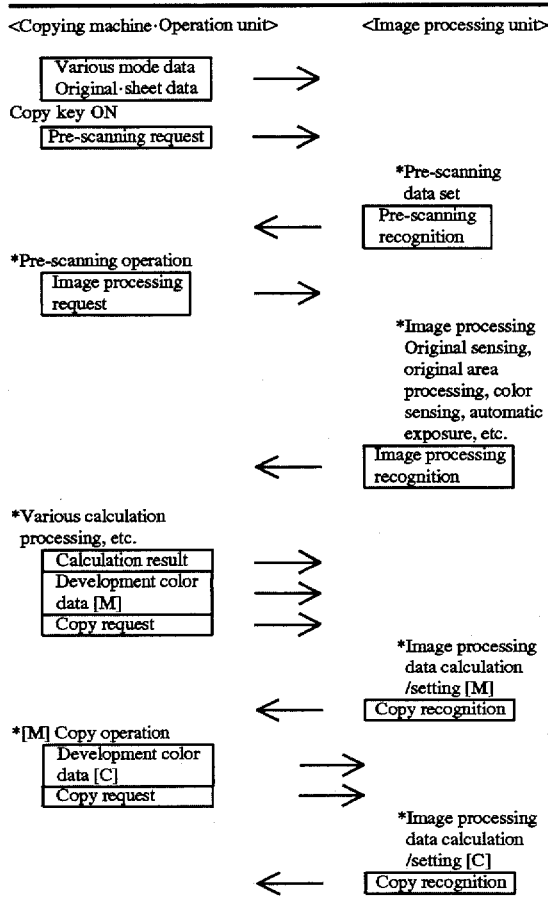

TABLE 2-continued

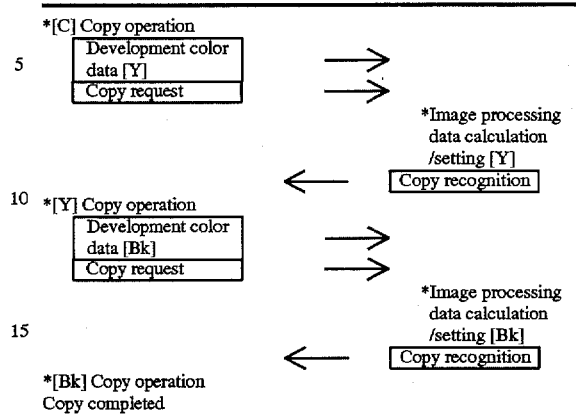

*[Bk] Copy operation
Copy completed

What is claimed is:

1. An image processing controller which sets various data necessary for an image forming operation by performing a data communication with an operation unit of an image forming apparatus, said image processing controller comprising:

pseudo operation means having a function equivalent to a function of an operation unit of an image forming apparatus with respect to data transfer; and image processing control means for performing a handshaking operation with the pseudo operation means.

2. An image processing controller according to claim 1, wherein said image forming apparatus is an electrographic copying machine, and wherein said image processing controller is adapted for incorporation into the electrographic copying machine.

3. An image processing controller according to claim 1, wherein said pseudo operation means is constituted by a first program of a central processing unit provided in the image processing controller, and wherein said image processing control means is constituted by a second program of the central processing unit, wherein the first and second programs are executed in parallel.

4. An image processing controller according to claim 3, wherein said image forming apparatus is an electrographic copying machine, and wherein said image processing controller is adapted for incorporation into the electrographic copying machine.

5. An image processing controller according to claim 1, further including first memory means for storing:

pseudo operation unit data transferred to the first memory means by the pseudo operation means, such that the storage of the pseudo operation unit data may be monitored by the image processing control means, and recognition data transferred to the first memory means by the image processing control means, such that the storage of the recognition data may be monitored by the pseudo operation means.

6. An image processing controller according to claim 5, wherein said image forming apparatus is an electrographic copying machine, and wherein said image processing controller is adapted for incorporation into the electrographic copying machine.

7. An image processing controller according to claim 5, further including second memory means for storing the pseudo operation unit data, wherein the pseudo operation unit data is transferred by the pseudo operation means from the second memory means to the first memory means.

8. An image processing controller according to claim 7, wherein said image forming apparatus is an electrographic copying machine, and wherein said image processing controller is adapted for incorporation into the electrographic copying machine.

9. An image processing controller according to claim 5, wherein the pseudo operation unit data includes one or more pieces of information selected from the following group: mode data, original sheet data, pre-scanning request data, image processing request data, calculation result data, magenta development color data, cyan development color data, yellow development color data, and copy request data.

10. An image processing controller according to claim 9, wherein said image forming apparatus is an electrographic copying machine, and wherein said image processing controller is adapted for incorporation into the electrographic copying machine.

11. An image processing controller according to claim 5, wherein the recognition data includes one or more pieces of information selected from the following group: pre-scanning recognition data, image processing recognition data, and copy recognition data.

12. An image processing controller according to claim 11, wherein said image forming apparatus is an electrographic copying machine, and wherein said image processing controller is adapted for incorporation into the electrographic copying machine.

* * * * *